(12) United States Patent
Starkey

(10) Patent No.: US 10,029,501 B2
(45) Date of Patent: Jul. 24, 2018

(54) IDENTIFICATION METHOD

(71) Applicant: Dover Europe Sarl, Vernier (CH)

(72) Inventor: Simon Starkey, Leicestershire (GB)

(73) Assignee: Dover Europe Sàrl, Vernier (CH)

( * ) Notice: Subject to any disclaimer, the term of this patent is extended or adjusted under 35 U.S.C. 154(b) by 0 days.

(21) Appl. No.: 15/479,065

(22) Filed: Apr. 4, 2017

(65) Prior Publication Data

US 2017/0282619 A1 Oct. 5, 2017

(30) Foreign Application Priority Data

Apr. 5, 2016 (GB) .................................. 1605779.6

(51) Int. Cl.
*B41J 29/38* (2006.01)
*B41J 2/32* (2006.01)
*G06K 15/00* (2006.01)
*G06K 7/10* (2006.01)
*G06K 15/02* (2006.01)
*G06K 7/00* (2006.01)

(52) U.S. Cl.
CPC ................ *B41J 29/38* (2013.01); *B41J 2/32* (2013.01); *G06K 7/0008* (2013.01); *G06K 7/10366* (2013.01); *G06K 15/028* (2013.01); *G06K 15/407* (2013.01)

(58) Field of Classification Search
CPC ......... B41J 29/38; B41J 2/32; G06K 7/10366; G06K 15/028; G06K 15/407; G06K 7/0008
USPC ...................................................... 358/1.15
See application file for complete search history.

(56) References Cited

U.S. PATENT DOCUMENTS

| 9,171,448 | B1 | 10/2015 | Foster | |
|---|---|---|---|---|
| 2006/0220859 | A1* | 10/2006 | Nagai | B41J 3/50 340/572.1 |
| 2007/0131769 | A1* | 6/2007 | Tanaka | B65C 11/0289 235/451 |

(Continued)

FOREIGN PATENT DOCUMENTS

| EP | 1638035 A1 | 3/2006 |
|---|---|---|
| EP | 1901198 A1 | 3/2008 |
| WO | WO2007149621 A1 | 12/2007 |

OTHER PUBLICATIONS

European Application No. EP17165016, European Search Report and Written Opinion, dated Aug. 24, 2017, 4 pages.

(Continued)

*Primary Examiner* — Allen H Nguyen
(74) *Attorney, Agent, or Firm* — Fish & Richardson P.C.

(57) ABSTRACT

A method of identifying a component of a system, the component including an RFID tag, and the system including a reader to read a signal transmitted by the RFID tag, the method including: varying an angular position of the component relative to the reader, taking readings of the strength of the signal transmitted by the RFID tag at a plurality of angular positions of the component, storing signal strength values at the plurality of angular positions of the component, and comparing the stored signal strength values versus angular position of the component relative to the reader with expected signal strength values versus angular position of the component relative to the reader to identify whether the component is an expected component.

20 Claims, 2 Drawing Sheets

(56) References Cited

U.S. PATENT DOCUMENTS

| | | | |
|---|---|---|---|
| 2008/0298870 A1* | 12/2008 | Tsirline | G06K 1/12 |
| | | | 400/613 |
| 2009/0083309 A1* | 3/2009 | Nehowig | G06Q 50/04 |
| 2010/0011978 A1* | 1/2010 | Whitelaw | B41F 13/24 |
| | | | 101/130 |
| 2011/0012775 A1 | 1/2011 | Richards et al. | |
| 2012/0157006 A1 | 6/2012 | Hong et al. | |
| 2014/0347165 A1 | 11/2014 | Bremer | |

OTHER PUBLICATIONS

Application No. GB1605779.6, Search Report under Section 17, dated Oct. 3, 2016, 1 page.

* cited by examiner

IDENTIFICATION METHOD

BACKGROUND

This invention relates to a method of identifying a component of a system, in particular, but not exclusively to a method for identifying a component of a printing apparatus, and combination of a system and a component, including an identification apparatus, in particular, but not exclusively to a combination including a printing apparatus and a printing consumable.

It is known to fit RFID (Radio Frequency Identification) tags to items of hardware, for example, the consumables of printers, for identification purposes. U.S. Pat. Nos. 7,664,257 and 6,099,178 disclose such a procedure, for example. These RFID tags can carry information about the items. An RFID tag contains a memory chip, a wireless interface circuit and a transmitter/transceiver. Another item, for example a printer, is fitted with a wireless interface circuit and an antenna (reader) to communicate with the tag of the item. This arrangement allows the printer to read information from the tag's memory and, optionally, write data back to the memory. In the example given, the information may be used by the printer to configure itself and optimise its operation with the consumables which are identified by their respective tags.

SUMMARY

Embodiments of the present invention aim to overcome or ameliorate one or more problems associated with the prior art. For example, there is a risk of users fitting incompatible and/or counterfeit supplies, i.e. consumables, to printers which risks damaging the printers. Such users may attempt to provide false information about the consumables by fitting a false RFID tag in front of the printer's antenna, to 'deceive' the printer into identifying an authentic consumable, such that the printer continues to operate despite the use of an incompatible and/or counterfeit consumable. Overcoming or ameliorating the above problem is at least one aim of the present invention.

In accordance with the present invention, there is provided a method of identifying a component of a system, the component including an RFID tag, and the system including a reader to read a signal transmitted by the RFID tag, the method including: varying an angular position of the component relative to the reader, taking readings of the strength of the signal transmitted by the RFID tag at a plurality of angular positions of the component, storing signal strength values at the plurality of angular positions of the component, and comparing the stored signal strength values versus angular position of the component relative to the reader with expected signal strength values versus angular position of the component relative to the reader (e.g., compare an actual pattern with an expected pattern of signal strength values) to identify whether the component is an expected component. The method can include providing the component and providing the system.

The method may include the step of identifying the angular position of the component at which the signal strength is at a maximum value.

A plurality of maximum signal strength values may be identified, the method including determining the largest signal strength value.

The method may include rotating the component to the angular position at which the maximum signal strength value is identified.

A plurality of signals may be transmitted by the RFID tag, and the strength of one or more of the plurality of signals may be determined and stored.

The method may include rotating the component through at least one complete revolution relative to the reader, and preferably through at least two complete revolutions relative to the reader.

The component may be rotated through at least two complete revolutions relative to the reader, the signal strength values stored in respect of the two complete revolutions are compared with one another to verify the accuracy of the signal strength values.

The method may include a pause between determining the signal strength value at a current angular position and rotating the component to the next angular position.

The or each pause may be one of a predetermined duration and randomly generated.

In the event that the component is not identified as an expected component, the method may include one of reducing the capabilities of the system and preventing operation of the system.

The system may be a printing apparatus and the component may be a printing consumable.

The identification of the component may be carried out simultaneously with one or more calibration processes of the printing apparatus.

According to a second aspect of the invention, there is provided a system including: a component of a printing apparatus, the component including an RFID tag; and the printing apparatus including a reader to read a signal transmitted by the RFID tag; wherein the printing apparatus includes a controller configured to vary an angular position of the component relative to the reader, take readings of the signal transmitted by the RFID tag at a plurality of angular positions of the component, store signal strength values at the plurality of angular positions of the component, and compare the stored signal strength values versus angular position of the component relative to the reader with expected signal strength values versus angular position of the component relative to the reader (e.g., compare an actual pattern with an expected pattern of signal strength values) to identify whether the component is an expected component.

The controller of the printing apparatus may be configured to rotate the component through at least two complete revolutions relative to the reader, and compare the stored signal strength values with one another to verify an accuracy of the stored signal strength values.

The component may be a spool of a printing consumable of the printing apparatus, and the controller of the system may be configured to identify the printing consumable concurrently with performing one or more calibration processes of the printing apparatus.

According to a third aspect of the invention, there is provided a combination of a system and a component of the system, the combination including an identification apparatus, the identification apparatus including a reader which is operable to read a signal from an RFID tag carried by the component, the component being rotatable relative to the reader, and a controller which is operable to control the rotation of the component relative to the reader, and to store signal strength values detected by the reader, wherein the controller is operable to compare the stored signal strength values versus angular position of the component relative to the reader with expected signal strength values versus angular position of the component relative to the reader (e.g., compare an actual pattern with an expected pattern of signal strength values).

The system may be a printing apparatus and the component may be a printing consumable.

The printing apparatus may be a thermal transfer printer and the printing consumable may be a spool of printing ribbon.

The reader may be mounted in the printing apparatus substantially adjacent to a spool mount for receiving a spool of printing ribbon.

The reader may be positioned adjacent the spool support upon which a take-up spool is mountable.

BRIEF DESCRIPTION OF THE DRAWINGS

Embodiments of the invention will now be described, by way of example only, with reference to the accompanying drawings in which.

DETAILED DESCRIPTION

Figure 1:
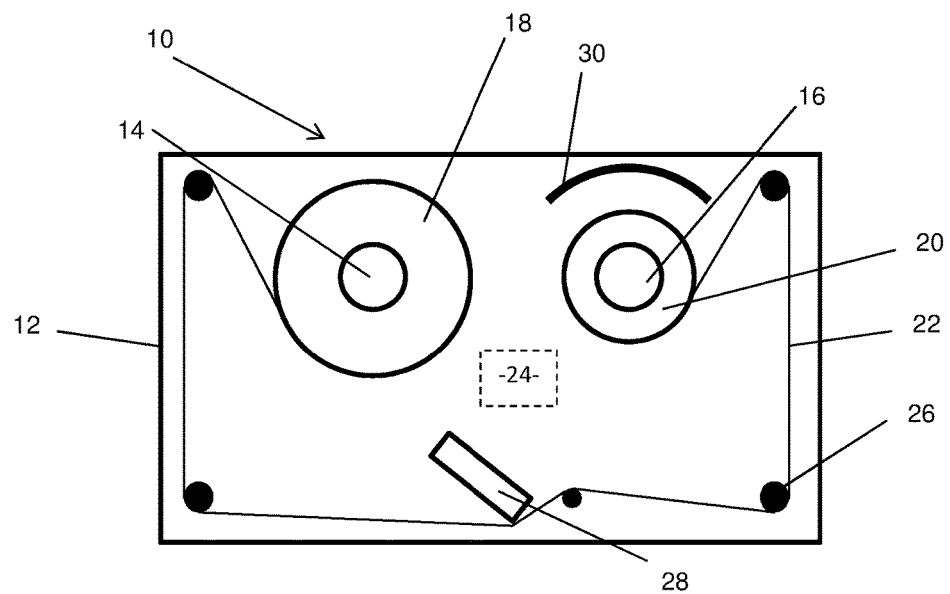
FIG. 1 is an illustrative view of a printing apparatus including an identification device in accordance with the present invention.

FIG. 1 shows a system, which in the present example includes a printing apparatus 10. The printing apparatus 10 is a thermal transfer printing apparatus, which includes a housing 12, in or on which is mounted a first spool support 14 and a second spool support 16. The spool supports 14, 16 are spaced laterally from one another.

A spool of tape 18, 20, in this case inked printer ribbon 22, is mountable on each of the supports 14, 16. The spools 18, 20 are components of the system. In the present example, the spool 18 is depicted as a 'supply' spool, i.e. which is supplied bearing a quantity of substantially unused ribbon 22, and the spool 20 is depicted as a 'take-up' spool, i.e. a spool which is supplied substantially empty, such that it is able to receive the ribbon 22 which is unwound from the supply spool 18 during use of the printing apparatus 10.

The printing apparatus 10 also includes a plurality of guide members 26 for guiding the ribbon 22 from one spool 18, 20 to the other, past a printhead 28. The printing apparatus 10 would also typically include a platen or roller for guiding a substrate, which would be positioned adjacent the printhead 28, but which is not shown in the accompanying drawings. It will be appreciated that this construction of the printing apparatus 10 described herein and as shown in the drawings is exemplary only.

Each of the spool supports 14, 16 is independently drivable by a respective motor. Each motor may be a stepper motor. Each of the spool supports 14, 16 is rotatable clockwise and anti-clockwise. The printing apparatus 10 includes a controller 24 which is electrically connected to each motor and is operable to control the amount of drive provided by each of the motors, so as to control the angular positions and velocities of the spool supports 14, 16. The position of the controller 24 is unimportant for the purpose of the invention. The controller 24 receives inputs from other components of the printing apparatus 10 as will be explained in detail below.

The printing apparatus 10 also includes an identification apparatus which includes an antenna (reader) 30 which is operable to read an RFID tag, and to transfer data to the controller 24. In the present example, the antenna 30 is positioned adjacent the spool mount 16 upon which the take-up spool 20 is mountable. Such positioning is advantageous, as will become apparent; however, it will be appreciated that the antenna 30 may be otherwise positioned, for example near to the spool support 14 upon which the supply spool 18 is mountable.

Figure 2:
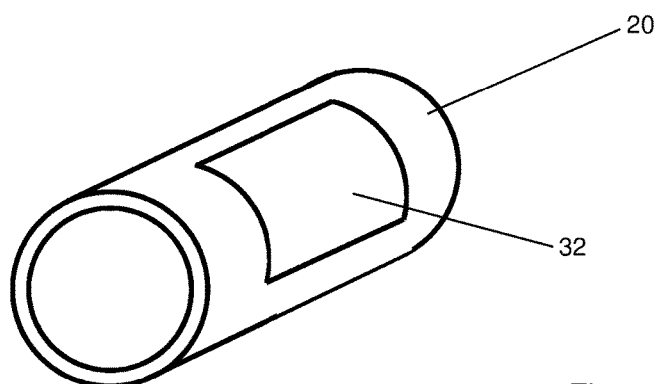
FIG. 2 is a spool of ribbon for the printing apparatus of FIG. 1, including an RFID tag.

One of the spools 18, 20 is provided with an RFID tag 32. In the present example (as shown in FIG. 2), the take-up spool 20 is provided with the tag 32. The tag 32 is attached to an outer surface of the spool 20. It will be appreciated that the tag 32 could be positioned elsewhere on or in the spool, or on the ribbon 22, for example towards a 'free' end of the ribbon 22 which would be one of the first portions of ribbon 22 to be transferred from the supply spool 18 to the take-up spool 20 during use of the printing apparatus 10. As described above, the RFID tag 32 may be a standard RFID tag which includes a memory chip, a transmitter/transceiver and a wireless interface circuit.

In use, the supply spool 18 is mounted on the first spool support 14, and take up spool 20 is mounted on the second spool support 16. The tag 32 which is positioned on the take-up spool 20 is thus located adjacent the antenna 30. The tape 22 extends in a tape path from the supply spool 18 around the guide members 26, past the printhead 28, around further guide members 26, and on to the take-up spool 20.

An identification process is carried out, for example when a new spool 18, 20 of ribbon is fitted into the printing apparatus 10, and/or for example upon start-up of the printing apparatus 10.

The identification process includes the tag 32 transmitting a signal from its memory to the antenna 30. The tag 32 may transmit the signal continuously, or may transmit a plurality of intermittent signals. The identification process also includes rotating at least the spool 18, 20 which bears the tag 32. The spool 18, 20 bearing the tag 32 may be rotated through one complete revolution. Since the motors which control the rotation of the spools supports 14, 16, and hence the spools 18, 20, are preferably position controlled motors (e.g. stepper motors), the controller 24 has direct control over an angular position θ of the spool 18, 20 bearing the tag 32.

As a consequence of the rotational movement of the tag 32, the proximity of the tag 32 to the antenna 30 will vary. Thus the strength of the signal S received by the antenna 30 from the tag 32 will also vary. The angle of the antenna which is incorporated in the tag 32 relative to the antenna 30 of the printing apparatus (which remains stationary) will vary during rotation of the spool 18, 20 to which the tag 32 is attached and hence the coupling between the tag 32 and the antenna 30, will vary, which will also affect the signal strength S received by the antenna 30.

Figure 3:
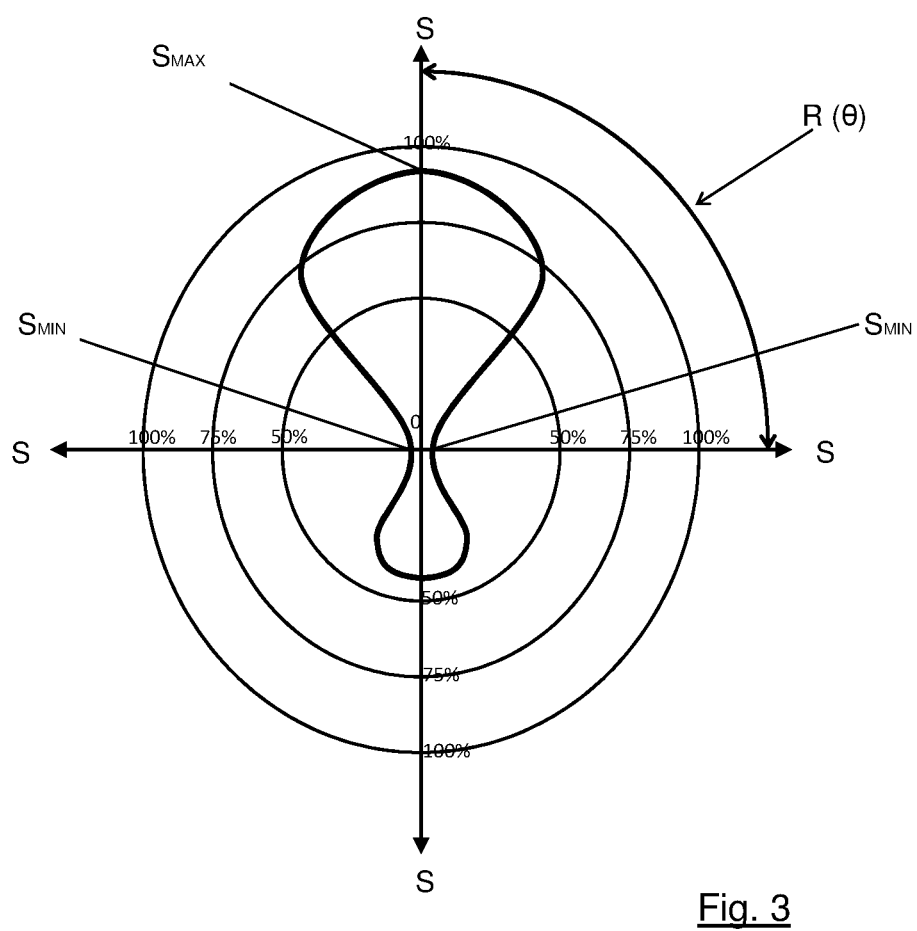
FIG. 3 is a polar plot showing variation in signal strength S of the RFID tag as the spool of FIG. 2 is rotated.

The controller 24 monitors the signal strength S received by the antenna 30. When the signal strength S is plotted on a polar diagram (as shown in FIG. 3), the signal strength S will show a distinctive pattern, with the maximum signal strength $S_{MAX}$ occurring when the tag 32 is closest to and substantially parallel with the antenna 30, and a minimum signal strength $S_{MIN}$ occurring when the tag is perpendicular the antenna 30.

If the spool 18, 20 bearing the tag 32 is rotated through more than one revolution, the signal strength pattern should repeat. However, it will be appreciated that if an excessive number of rotations are carried out, and ribbon 22 is transferred from the supply spool 18 to the take-up spool 20, then attenuation of the signal could be experienced (if the tag 32 is provided on the take-up spool 20).

Once the identification process has been carried out, the controller 24 is able to establish the position of a core of the spool 18, 20 bearing the tag 32 which provided maximum signal strength S, and whether there is a tight 'binding' or relationship between the angular position θ of the spool 18, 20 and the received signal strength S received by the antenna 30, which verifies that the tag 32 is being rotated by the printing apparatus 10 (i.e. by the motor which controls the movement of the spool support 14, 16 upon which the spool 18, 20 bearing the tag 32 is mounted).

The controller 24 may be programmed to randomly alter the speed of rotation of the spool support 14, 16 upon which the spool 18, 20 bearing the tag 32 is mounted, to provide further validation that the changes in signal strength S are being caused by rotation of the spool, and not as a result of a pre-programmed signal transmission by the tag 32, for example.

In more detail, the identification process preferably includes the following steps:

a) the controller 24 clears any stored values relating to a previous or existing spool;

b) the controller 24 interrogates the wireless interface of the antenna 30 to determine the current signal strength S from the RFID tag 32—this value is a common output of industry standard wireless controllers;

c) the current signal strength value S is stored by the controller 24, in a free entry (preferably the next free entry) in a list of stored values in the controller (the 'list' may be empty before the first value is stored);

d) the controller 24 controls at least the motor which drives the spool support 14, 16, upon which the spool 18, 20 bearing the tag 32 is mounted, so as to rotate the spool 18, 20 through a portion of a complete revolution, for example one twentieth of a complete revolution) (18°)—the angle of rotation is determined by the number of data points, i.e. samples, required through one revolution of the spool 18, 20;

e) the controller 24 may pause, preferably until the spool 18, 20 has settled at its new position;

f) the controller 24 repeats steps b) to e) until the spool 18, 20 has completed at least two revolutions (it will be appreciated that fewer revolutions may be completed, but two revolutions improves accuracy);

g) the controller 24 scans the resulting list of values to determine the maximum signal strength value(s) $S_{MAX}$ and the minimum signal strength value(s) $S_{MIN}$—a maximum value can be detected where the gradient of a slope (dS/dθ) between at least three adjacent/consecutive signal strength values S changes from positive to negative and a minimum value can be detected where the gradient of the slope (dS/dθ) between at least three adjacent/consecutive signal strength values S changes from negative to positive;

h) the maxima $S_{MAX}$ may be examined to confirm that the two largest values occur one revolution apart (i.e. 20 samples apart in this example);

i) the minima $S_{MIN}$ may be examined to confirm that the smallest values are half a revolution apart (i.e. 10 samples apart in this example)

j) the controller 24 may control the motor driving the spool support 14, 16 on which the spool 18, 20 bearing the tag 32 is mounted, to the angular position θ indicated by the highest signal strength value $S_{MAX}$, in order to facilitate error free communication between the tag 32 and the antenna 30;

k) the controller 24 may perform an algorithm to match the signal strength versus rotation pattern with an expected pattern which would be exhibited by tag 32 attached to an authentic and compatible spool 18, 20;

l) the tag 32 may transmit additional data to the antenna 30, which includes identification data, which is provided as an input to the controller 24, such that the controller 24 may ascertain whether the spool 18, 20 to which the tag 32 is applied is a spool 18, 20 which is compatible with the printing apparatus 10.

It will be appreciated that not all of the steps above are essential, and that some may be omitted from the identification process. Furthermore, the order of the steps may be modified.

The pause or time delay at step (e) may be predetermined, and/or may be randomly varied, so as to verify that the signal strength variation is due to rotation of the tag 32 relative to the antenna 30, rather than a predetermined routine being performed by the tag 32 to deceive the antenna 30, and hence the printing apparatus 10.

The exact pattern of signal strength S versus rotation may be different in different printing apparatus, for example as a result of differences in layout of components, in particular metallic components, within the excitation field of the tag 32. Therefore, an algorithm responsible for pattern matching (as described in step (k)) may be different for different printing apparatus and/or for different spool types, although the general process of matching an expected pattern to the pattern experienced or achieved would remain as described above.

Failure to detect a valid signal strength versus angular position pattern can indicate that an incompatible or counterfeit spool 18, 20 has been mounted in the printing apparatus 10, and/or that an attempt to circumvent the identification system has been made. If the controller 24 fails to recognise the spool 18, 20 as a compatible spool 18, 20, then the controller 24 may cause the printing apparatus 10 to perform only a subset of activities or may cause the printing apparatus 10 not to operate at all. This reduced level of performance may continue unless and/or until a compatible spool 18, 20 is mounted in the printing apparatus 10 and has been identified as such by the identification process.

Thermal transfer printers, of the type described generally above, typically undertake a calibration process, for example to determine or measure the diameters of each of the spools 18, 20, to allow the controller 24 to match the angular speed of the motor(s) driving the spools 18, 20 with the linear speed of the ribbon 22 leaving or entering the or each spool 18, 20. Such a calibration process is described in U.S. Pat. No. 8,665,301. The identification process can be incorporated into such a calibration process (or another type of calibration process carried out by the printing apparatus 10) to reduce the impact on a user (for example in terms of time before the printing apparatus 10 is operational).

Whilst the above example is directed to a printing apparatus and a spool of ribbon/tape, it will be appreciated that the identification apparatus and/or the identification method may be used in relation to other items, in particular items which rotate, or could be caused to rotate relative to a second item.

The above example has described and shown the antenna 30 being positioned adjacent the take-up spool support 16 and the tag 32 being preferably provided on the take-up spool 20. Advantages of this are that the tag 32 could be damaged during the manufacturing process of the spools 18, 20 if the tag 32 were to be positioned on the supply spool 18. Furthermore, if the tag 32 were positioned on the body of the supply spool 18, or at the end of the ribbon 22 closest to the body of the supply spool 18, there is the possibility of the windings of the ribbon 22 around the supply spool 18 causing attenuation of the signal received by the antenna 30, and false negative results being experienced, for example.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A method of identifying a component of a system, the component comprising an RFID (Radio Frequency Identification) tag, and the system comprising a reader to read a signal transmitted by the RFID tag, the method comprising:
   varying an angular position of the component relative to the reader;
   taking readings of the signal transmitted by the RFID tag at a plurality of angular positions of the component;
   storing signal strength values at the plurality of angular positions of the component; and
   comparing the stored signal strength values versus angular position of the component relative to the reader with expected signal strength values versus angular position of the component relative to the reader to identify whether the component is an expected component.

2. The method of claim 1, comprising identifying an angular position of the component at which the signal strength is at a maximum value.

3. The method of claim 2, comprising:
   identifying a plurality of maximum signal strength values; and
   determining a largest signal strength value of the plurality of maximum signal strength values.

4. The method of claim 2, comprising rotating the component to the angular position at which the maximum signal strength value is identified.

5. The method of claim 1, wherein a plurality of signals is transmitted at each angular position by the RFID tag, and the strength of one or more of the plurality of signals is determined and stored.

6. The method of claim 1, wherein varying the angular position of the component relative to the reader comprises rotating the component through at least one complete revolution relative to the reader.

7. The method of claim 6, wherein rotating the component comprises rotating the component through at least two complete revolutions relative to the reader, storing the signal strength values comprises storing the signal strength values with respect to the at least two complete revolutions, and the method comprises comparing the signal strength values with one another to verify an accuracy of the signal strength values.

8. The method of claim 1, comprising including a pause between determining the signal strength value at a current angular position and rotating the component to a next angular position.

9. The method of claim 8, wherein the or each pause is one of a predetermined duration and randomly generated.

10. The method of claim 1, wherein, responsive to identifying that the component is not the expected component, the method comprises one of reducing capabilities of the system and preventing operation of the system.

11. The method of claim 10, wherein the system is a printing apparatus and the component is a printing consumable.

12. The method of claim 11, wherein the identification of the component is carried out simultaneously with one or more calibration processes of the printing apparatus.

13. A system comprising:
   a component of a printing apparatus, the component comprising an RFID (Radio Frequency Identification) tag; and
   the printing apparatus comprising a reader to read a signal transmitted by the RFID tag;
   wherein the printing apparatus comprises a controller configured to vary an angular position of the component relative to the reader, take readings of the signal transmitted by the RFID tag at a plurality of angular positions of the component, store signal strength values at the plurality of angular positions of the component, and compare the stored signal strength values versus angular position of the component relative to the reader with expected signal strength values versus angular position of the component relative to the reader to identify whether the component is an expected component.

14. The system of claim 13, wherein the controller of the printing apparatus is configured to rotate the component through at least two complete revolutions relative to the reader, and compare the stored signal strength values with one another to verify an accuracy of the stored signal strength values.

15. The system of claim 13, wherein the component is a spool of a printing consumable of the printing apparatus, and the controller of the system is configured to identify the printing consumable concurrently with performing one or more calibration processes of the printing apparatus.

16. A combination of a system and a component of the system, the combination including an identification apparatus, the identification apparatus including a reader which is operable to read a signal from an RFID tag carried by the component, the component being rotatable relative to the reader, and a controller which is operable to control the rotation of the component relative to the reader, and to store signal strength values detected by the reader, wherein the controller is operable to compare the stored signal strength values versus angular position of the component relative to the reader with expected signal strength values versus angular position of the component relative to the reader.

17. The combination of claim 16, wherein the system is a printing apparatus and the component is a printing consumable.

18. The combination of claim 17, wherein the printing apparatus is a thermal transfer printer and the printing consumable is a spool of printing ribbon.

19. The combination of claim 18, wherein the reader is mounted in the printing apparatus adjacent to a spool mount for receiving a spool of printing ribbon.

20. The combination of claim 19, wherein the reader is positioned adjacent the spool support upon which a take-up spool is mountable.

* * * * *